United States Patent [19]

McEwan

[11] Patent Number: 5,609,059

[45] Date of Patent: Mar. 11, 1997

[54] ELECTRONIC MULTI-PURPOSE MATERIAL LEVEL SENSOR

[75] Inventor: Thomas E. McEwan, Livermore, Calif.

[73] Assignee: The Regents of the University of California, Oakland, Calif.

[21] Appl. No.: 359,090

[22] Filed: Dec. 19, 1994

[51] Int. Cl.$^6$ ..................................... G01S 13/00
[52] U.S. Cl. ..................... 73/290 R; 73/290 V; 342/124
[58] Field of Search ............................. 73/290 V, 290 R; 324/644; 342/124

[56] References Cited

U.S. PATENT DOCUMENTS

| | | | |
|---|---|---|---|
| 2,709,918 | 6/1955 | Yetter | 73/290 V |
| 3,394,589 | 7/1968 | Tomioka | 73/290 V |
| 3,832,900 | 9/1974 | Ross | 73/290 R |
| 3,995,212 | 11/1976 | Ross | 73/290 R X |
| 4,135,397 | 1/1979 | Krake | 73/290 R |
| 4,489,601 | 12/1984 | Rao et al. | 73/290 R |
| 4,621,264 | 11/1986 | Yashiro et al. | 342/124 |
| 5,249,463 | 10/1993 | Willson et al. | 73/290 R |
| 5,345,471 | 9/1994 | McEwan | 375/1 |

*Primary Examiner*—William A. Cuchlinski, Jr.
*Assistant Examiner*—Willie Morris Worth
*Attorney, Agent, or Firm*—Henry P. Sartorio

[57] ABSTRACT

The present electronic multi-purpose material level sensor is based on time domain reflectometry (TDR) of very short electrical pulses. Pulses are propagated along a transmission line that is partially immersed in a liquid, powder, or other substance such as grain in a silo. The time difference of the reflections at the start of the transmission line and the air/liquid interface are used to determine levels to better than 0.01 inch. The sensor is essentially independent of circuit element and temperature variations, and can be mass produced at an extremely low price. The transmission line may be a Goubau line, microstrip, coaxial cable, twin lead, CPS or CPW, and may typically be a strip placed along the inside wall of a tank. The reflected pulses also contain information about strata within the liquid such as sludge-build-up at the bottom of an oil tank.

33 Claims, 6 Drawing Sheets

ELECTRONIC MULTI-PURPOSE MATERIAL LEVEL SENSOR

STATEMENT OF GOVERNMENT RIGHTS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to sensors, and it more particularly relates to level sensors for gauging the level and condition of fluids and other materials in containers, as well as in reactors, pipes, river beds, irrigation ditches, conveyors, free standing piles, and a variety of other systems. Additionally, the present invention relates to a linear displacement transducer for use in machine tools, hydraulic actuators and similar devices with movable components.

2. Background Art

Various devices have been conventionally employed to measure the level of a liquid or the interface levels between two liquids. Generally, these devices consist of a sensor within a container, and means for sending data from the sensor to a remote location where it would be detected and converted into a usable format representative of the level of liquid within the container.

Exemplary mechanical and electromechanical sensors such as floats, are unreliable, and are difficult to use in deep tanks or tanks filled with corrosive liquids. Devices using sonic and ultrasonic signals are relatively inaccurate because the speed of sound varies with temperature and humidity. Ultrasound based sensors do not provide an accurate measurement of the true fluid level, since ultrasound signals generally reflect off foamy material (or foam) which might form on the fluid surface. In capacitive level sensors the liquid must be close to the sensor, and wall wetting can be erroneously sensed by the sensor. Also, a capacitive sensor does not provide information about the condition of the fluid or mixture in which it is immersed.

Frequency modulation (FM)-continuous wave (CW) radar sensors have also been used to measure the liquid level in a container. In these sensors, a free propagating radar signal is transmitted toward the liquid surface upon which it is reflected back to a receiver for determining the signal time of flight, and thus the distance between a reference point and the fluid level. These radar sensors are expensive, bulky, and have limited resolution, typically 6 inches.

Most conventional time domain reflectometry (TDR) systems provide accurate indications of liquid level and respond quickly to changes in the liquid levels, but they require very complex and expensive systems to function properly. One such system is described in U.S. Pat. No. 3,832,900 to Ross and utilizes an open coaxial line that is immersed in, and filled by the contained liquid. The liquid surface creates a discontinuity in the coaxial line that produces a reflection of the baseband pulse signal that propagates back along the transmission line. The time at which this reflection is received, relative to the time of the transmitted pulse, determines the liquid level. However, the transmission line tends to clog and requires frequent cleaning.

U.S. Pat. No. 3,995,212 to Ross describes an apparatus for measuring the liquid level, which aims at addressing the clogging problem and reducing the complexity of the radiation reflection detection systems. More specifically, this patent describes an apparatus formed of a pulse generator that produces a baseband probe pulse of subnanosecond duration, which is coupled to a transition device through a directional coupler. The transition device converts the transmission line guiding the probe pulse into a single wire transmission line along which the wave continues to propagate. The wire is positioned perpendicular to the surface of the liquid and extends therethrough. Reflections of the probe pulse, caused by the change in dielectric constant at the surface of the liquid, are propagated back along the wire toward the transition device and coupled to the directional coupler.

Samples of the reflected wave are coupled to the reflection port of the directional coupler which also possesses a port at which samples of the incident waves appear. These ports are coupled through a switch to a level processor in which the delay between the incident and reflected waves is determined. This delay is utilized to determine the liquid level. However, this liquid level detection system is relatively expensive and bulky, and does not enable the measurement of the depth of the electrically conductive liquids.

U.S. Pat. No. 4,489,601 to Rao et al. describes an apparatus for measuring the height of a conductive or nonconductive liquid above a reference level. A Goubau transmission line extends from an input terminal to a junction with a hollow cylinder having a diameter that is greater than the outer diameter of the Goubau line. At this junction, the Goubau line extends into the hollow cylinder to form a coaxial transmission line, which is immersed vertically in a liquid where it extends from above the surface of the liquid to some reference level below the surface, typically the bottom.

A pulse is coupled to the Goubau line at the input terminal and propagates as a surface wave until it reaches the junction where it is transformed into two modes: a surface wave mode on the outside of the coaxial line and a transverse electromagnetic mode within the coaxial line. A transition device controls the relative power distributed to the two modes. A reflection occurs when the surface wave propagating on the outside of the coaxial line encounters the surface of the liquid. The transverse electromagnetic mode remains entirely within the coaxial line and is not reflected until a later time when it reaches the reference level below the surface. The reflected surface wave on the outside of the coaxial line and the reflected transverse electromagnetic mode wave within the coaxial line propagate back along the coaxial line, and are coupled to the Goubau line as reflected surface waves separated in time. The reflected waves propagating on the Goubau line are transferred to a direction coupler and detected by a receiver. The time between the received pulses is proportional to the distance from the surface of the liquid to the reference level. However, this conventional TDR level sensing apparatus is relatively expensive and bulky.

There is therefore a great and still unsatisfied need for a new material level sensor which addresses the foregoing concerns associated with conventional devices, and which provide adequate solutions thereto. This new level sensor should be capable of gauging the level and condition of fluids and other materials in containers, as well as in reactors, pipes, river beds, irrigation ditches, conveyors, free standing piles, and a variety of other systems. Additionally, the new sensor should also be amenable for use as a linear displacement transducer in machine tools, hydraulic actuators and similar devices with movable components.

SUMMARY OF THE INVENTION

Accordingly, it is an object of the present invention to provide an improved level sensor which is inexpensive, accurate, light in weight, and simple to use.

It is another object of the present invention to provide a level sensor which is compact in size for use in tight environments and complex structures.

It is yet another object of the present invention to provide a new level sensor which has an extremely low power consumption as well as a long operation range.

It is still another object of the present invention to provide a new level sensor which can be used to gauge the level and condition of fluids and other materials, such as granular materials.

It is a further object of the present invention to provide a new level sensor which can locate moving reflecting interfaces for translational measurements.

It is another object of the present invention to provide a sensor which can also be used as a linear displacement transducer.

It is still another object of the present invention to provide a level sensor which detects the true liquid level to be measured, and which is generally insensitive to foamy material.

Briefly, the above and further objects and advantages of the present invention are realized by a new level sensor which is based on time domain reflectometry (TDR) of very short electrical pulses. Pulses are propagated along a transmission line immersed in a material, such as a fluid or solid substance. The time difference between an induced reference reflection and the multi-dielectric interface surface enables the measurement of the material level and condition.

The sensor is mostly independent of circuit elements and temperature variations and can be inexpensively manufactured. The transmission line may be a Goubau line, microstrip, coaxial cable, twin lead, coplanar strip or coplanar waveguide. Typically, it includes a strip placed along the inside wall of a tank or container. The reflected pulses also contain information about strata within the fluid, such as sludge build-up at the bottom of an oil tank. The sensor can be hand portable and readily usable in confined and hard to reach places. Additionally, it can also be used for translational measurements of objects in close proximity to the transmission line.

In automotive or similar fields of use, the sensor can be used as a dipstick to determine the fill levels in gas tanks, crankcases, transmissions, rear ends, brake fluid reservoirs, windshield water bottles, laundry machine fill level, industrial vat fill levels, etc. The sensor can also replace most level sensors including those used in toilets, grain silos and gas station storage tanks, oil supertankers, etc. It can further be used as a linear displacement transducer for machine position control, limit switches and musical instruments, wherein a metal or dielectric object is moved in close proximity to, or in contact with the transmission line.

The sensor includes an extremely simple and low cost sampler comprised of only a single diode. The signal to be sampled is applied to one terminal, i.e., the anode of the diode, while the gate pulse is applied to the other terminal, i.e., the cathode. Further, the common problem of sampler blowby or unsampled, spurious coupling from the signal input to the sampler output is not a source of concern, since the signal has only high frequency components and zero average, as will be explained below with respect to the TDR system configuration. An amplifier having limited high frequency bandwidth is connected to the sampler, and blocks these high frequency components. Thus, complicated blowby cancellation circuitry found in conventional samplers, such as Tektronix Model S-4, is eliminated.

Additionally, the present sensor has a self biasing design, in that average rectified gate pulses develop about 1 V DC reverse bias across the sampling diode in order to prevent forward conduction of the diode during the transmit pulse. A capacitor (C=22 picofarads) holds and smooths this bias, while a single 1 megohm bias resistor to ground forms a bleeder to maintain bias voltage with an absolute minimum of bias circuitry.

The sample buffer amplifier uses a transimpedance amplifier that essentially defines the bandwidth. The transimpedance amplifier is AC coupled to eliminate the effects of variation in sampling diode forward drop and reverse bias. Further, its high frequency bandwidth is limited to less than the PRF to prevent amplification of pulse-to-pulse bias variations that occur at the pulse repetition frequency (PRF) rate of 2 MHz, and to smooth random noise.

The sensor further includes a range sweep circuit which uses a very simple RC delay circuit in the receive gate path, that provides an exponential delay function with respect to the control range delay voltage supplied through a 4.7 kilohm-resistor. This unique design for the range sweep clearly distinguishes the present invention over conventional sensors which require expensive and complicated precision high speed analog current sources and comparators to form a linear voltage ramp delay circuit.

An equivalent time (ET) exponential ramp is used as a sweeping reference input to the above real time exponential delay ramp circuit, in order to provide a linear swept delay function with a minimum of components. Additionally, the range sweep circuit is relatively independent of power supply ($V_{CC}$) variations, since the power supply simultaneously defines the real time and the equivalent time ramp amplitudes and the decision threshold ($V_{TH}=V_{CC}/2$) of the comparator function (formed by a logic inverter). In this respect, if $V_{CC}$ increases by ten percent, the ramp amplitudes as well as the decision threshold voltage $V_{TH}$ increase by ten percent, such that the threshold point on the real time ramp remains the same (50% of the maximum amplitude), i.e., at the same delay despite the ten percent increase in the power supply $V_{CC}$. This cancellation effect is very important for stable, low jitter timing.

The sensor further includes a dithered PRF circuit which prevents interference from co-located sensors and from CW emitters, such as radio stations. The dithered PRF circuit also reduces interference to communications services by spreading the spectral lines of spurious emissions from a guide wire, transmission line, or sensor tip, thereby reducing peak amplitude at any particular frequency.

The sensor also includes a fast pulse generator, which forms part of a transmit pulse generator and gate pulse generator, and which is comprised of a high speed CMOS or Schottky TTL logic gate/inverter driving a microwave silicon bipolar transistor. The fast pulse generator is available at an extremely low price, has a low power consumption (for instance, less than 1 mA), and operates at high speed (i.e., 100 ps transition time). It also produces very "clean" transitions free of ringing, due to the saturation of the transistor at the end of the fast transition. Alternative conventional fast pulse generators are primarily based on step recovery diodes that are relatively quite expensive.

The sensor employs a deliberate impedance mismatch at the beginning of the sensor transmission line, such that the reflected fiducial pulse at the mismatch eliminates timing drift, i.e., zero offset in the range readings.

The TDR is comprised of (1) a small (i.e. 1 picofarad) differentiating capacitor connected from the transmit pulse generator to a cable drive node; (2) a 50-ohm terminating resistor connected from the drive node to ground; (3) a sampling diode connected to the drive node. Thus, the present TDR is simpler than most if not all comparable conventional TDR's. Normally, an existing TDR would include a resistor is in place of the capacitor, and a separate pulse forming network is needed to differentiate the pulse supplied by the transmit pulse generator. The capacitor used in the present TDR is sufficiently small that is does not load the circuit relative to the reflected pulses appearing at the drive node, and therefore these pulses are not attenuated, as would be the case with conventional TDR's, where a resistor is used. Additionally, these conventional TDR's often use an expensive and lossy directional coupler.

The orientation of the sampling diode prevents unintentional turn-on by the transmit pulse, and enables it to be turned on by the gate pulse only. During the transmit pulse duration, the diode, which is normally reverse biased by a DC bias voltage, is further reverse biased by the transmit pulse, keeping it effectively isolated from the drive node and allowing maximum transmit pulse amplitude to be delivered to the cable for optimum signal-to-noise ratio.

The present sensor can also be used as, or in conjunction with a construction tool. For instance, the sensor can be used with a drill to provide accurate information about the drilling depth. It can also be used as a safety sensor for power windows in automobiles, whereby a guide wire is embedded in the window glass, and the close proximity of a hand (or an object) causes a reflection that can be detected for the purpose of turning off the power to the window motor.

BRIEF DESCRIPTION OF THE DRAWINGS

The above and other features of the present invention and the manner of attaining them, will become apparent, and the invention itself will be best understood, by reference to the following description and the accompanying drawings, wherein.

DETAILED DESCRIPTION OF THE PREFERRED EMBODIMENTS

Figure 1:
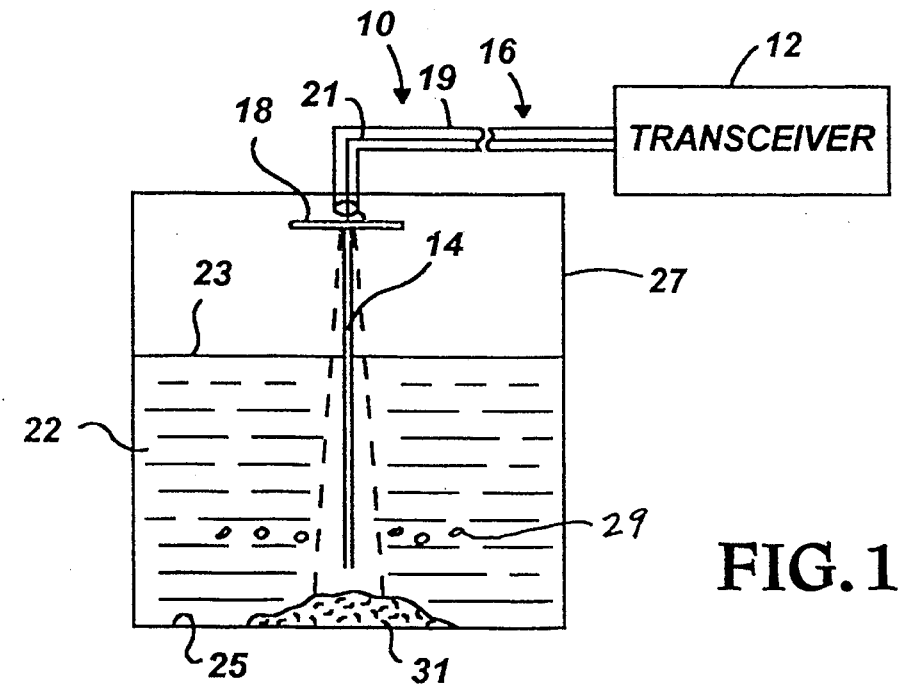
FIG. 1 is a side view of a material level sensor positioned according to a first preferred embodiment of the present invention.
Figure 2:
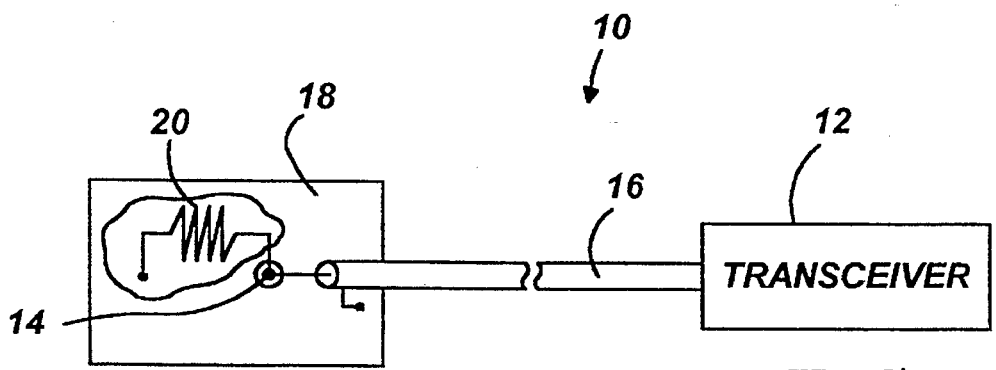
FIG. 2 is a top view of the sensor of FIG. 1.
Figure 3:
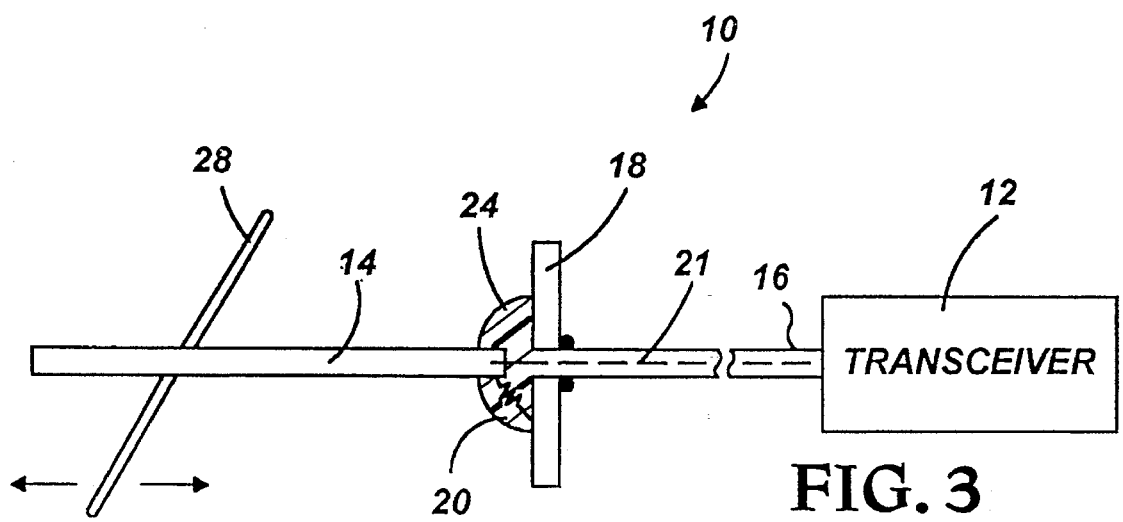
FIG. 3 is a side view of the sensor of FIGS. 1 and 2.

FIGS. 1, 2 and 3 represent schematic illustrations of a level sensor 10 designed according to a first preferred embodiment of the present invention. The level sensor 10 generally includes a transceiver 12 that is electrically coupled to a guide wire or transmission line 14 via a cable 16, such as a 50-ohm coaxial cable. A launcher plate 18 is connected to the shield 19 of the cable 16 in order to prevent the inducement of a mirror image voltage on shield 19. The inner conductor 21 of the cable 16 is connected to the guide wire 14. As shown in FIG. 3, the cable 16 is sealably and seamlessly connected to the launcher plate 18, with a resistor 20 located on the backside of the launcher plate 18, and embedded within a plastic support housing 24.

The transceiver 12 generates very shod electrical pulses that are conducted over the cable 16 to the launcher plate 18, which acts as a transmit antenna ground plane, and which helps launch these electrical pulses as near field, guided electromagnetic (EM) waves. The EM waves propagate along the guide wire 14, which is shown immersed in fluid 22, and whose surface level 23 is to be determined. As the waves reach the surface of the fluid 22, they are partially reflected thereby due to the discontinuity created by the air-fluid interface.

The reflections propagate back along the guide wire 14 toward the launcher plate 18, which acts as a receive antenna ground plane, and therefrom, they are transmitted as reflection pulses to the transceiver 12. The transceiver 12 determines the time delay between the transmitted and reflected signals, from which the surface level 23 may be established relative to the launcher plate 18.

The magnitude $\Gamma$ of the reflected pulse is related to the dielectric constant of air, $\epsilon_0$, and the dielectric constant of the fluid, $\epsilon_{vat}$, as shown in the following equation:

$$\Gamma=[1-(\epsilon_{vat}/\epsilon_0)^{0.5}]/[1+(\epsilon_{vat}/\epsilon_0)^{0.5}]$$

The transceiver 12 measures the round trip travel time of the pulses and produces an equivalent time (ET) gate to a standard electronic counter or digital display. The gate duration increases with the increasing distance between the launcher plate 18 and the air/fluid interface with an equivalent time scale factor of 1.0 inch=1.0 ms. The launcher plate 18 facilitates launching the guided wave and minimizes hot ground problems on the cable 16.

An important feature of the sensor 10 is that a deliberate reflection is introduced at the launcher plate 18. In this respect, the resistor 20 connected between the launcher plate 18 and the guide wire 14 provides a local impedance discontinuity which causes partial reflection of the EM waves. This reflection is used as a fiducial or reference pulse by the transceiver 12. Measurements are taken between the fiducial pulse and the reflection pulses, relative to the launcher plate 18 rather than to the transceiver 12, and consequently errors and drift introduced by the cable 16 are significantly reduced if not completely eliminated.

The EM waves that are not reflected by the air/fluid interface continue their incident propagation through the fluid 22 toward the bottom 25 of a container or vat 27 holding the fluid 22. These EM waves are reflected off the bottom 25 and propagate back along the guide wire 14, for processing by the transceiver 12.

If during the incident propagation the electromagnetic waves encounter another two-substance interface layer, such as bubbles 29 or solid deposit 31 at the bottom 25 of the container 27, they are partially reflected back toward the launcher plate 18. In general, the present sensor 10 is able to detect any discontinuity along its propagation path, and further to measure the distance of such discontinuity from the launcher plate 18.

The general operation of the inventive sensor 10 is based on the emission of a pulse from the transceiver 12, waiting for a brief period of time ($T_{SAMP}$), and then opening a gate or window to allow the reflected pulses to be sampled. This process is repeated at 1 MHz rate, allowing approximately 10–100 receive pulses to be averaged prior to incrementing the waiting period $T_{SAMP}$. The high level of averaging reduces the random noise accompanying the sampled signal.

The averaged pulses provide a voltage level that corresponds to the pulse reflectivity at a particular range out of a set of ranges defined by the delay between the emitted pulse and the time of gating, or operating a sampler circuit. This process is referred to as "range gating", and provides depth information about the surface level and the interface surfaces being scanned.

The present invention sweeps or scans the "range gate" (i.e., the region being scanned) in equivalent time. As the range gate moves through the surface level or the interface surface, the reflectivity within the range gate changes, and is sensed by the transceiver 12. The gate is typically held open only for a duration equal to the emitted pulse width. The present invention also utilizes the concept of an ultra-wideband receiver described in U.S. Pat. No. 5,345,471 issued to Thomas E. McEwan, and entitled "Ultra-Wideband Receiver", which is incorporated herein by reference in its entirety.

Figure 4:
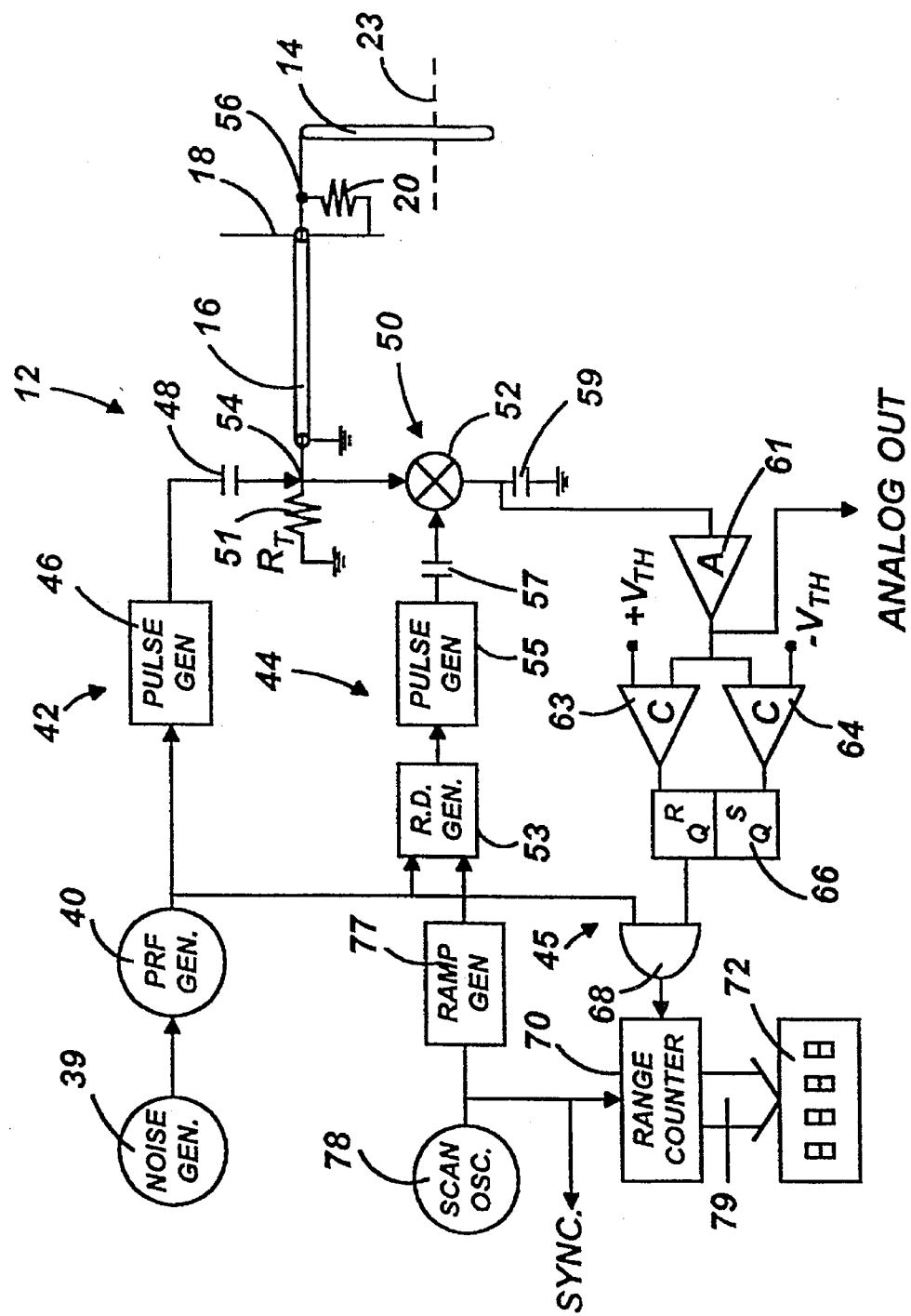
FIG. 4 is a block diagram of the electrical circuit forming the sensor of FIGS. 1 through 3.

FIG. 4 is a block circuit diagram of the transceiver 12, which includes an optional noise generator 39 for modulating a pulse repetition frequency/pulse repetition interval (PRF/PRI) generator 40 and for creating a PRF with a 10 kHz–10 MHz (e.g. 2 MHz) average and 1–10% random variation about 10 kHz–10 MHz (e.g. 2 MHz), i.e., a 1–10% PRF dither. The dither spreads the emission spectrum from the launcher plate 18 to reduce potential interference with RF spectrum users, and also randomizes the samples of extraneous interfering signals appearing at the guide wire 14.

The received signals or pulses at the launcher plate 18 are sampled and averaged, such that the randomized samples average to zero, thus substantially eliminating interference from other sources such as RF transmitters. The desired echoes are unaffected by the dithering since they are received at a fixed time shortly after they are transmitted and are not affected by the exact time of occurrence of the next repetition interval. Dithering provides spectrum compatibility with conventional RF users and allows multiple sensors to be used in close proximity. The chance of sampling the short pulses emitted by other pulse systems is both random and very low, and the probability of sequentially sampling enough pulses from another pulse system to build up a coherent, detectable signal is effectively zero for all practical purposes.

Pulses from the 2 MHz pulse repetition frequency/interval (PRF/PRI) generator 40 are input along two paths: a transmit path 42 and a gating path 44. In the transmit path 42, the PRF/PRI generator 40 drives a pulse generator 46, which provides a 5 V, 200 ps rise time step-like pulse that is edge-differentiated by a capacitor 48 (C=1 picofarad) into a 200 ps-wide impulse. The impulse at the output of the capacitor 48 is applied to the cable 16 and therefrom to the launcher plate 18.

The launcher plate 18 picks up the pulses reflected from the surface level 23 or the multi-substance interface layer, and applies them to a sample and hold circuit 50 via the cable 16. A termination resistor ($R_T$) 51, having a value equal to the characteristic impedance ($Z_0$) of the cable 16 is connected between a node 54 at the proximal end of the cable 16 and ground, in order to minimize triple-transit reflections between the node 54 and various discontinuities at a node 56 at the distal end of the cable 16. The node 56 is connected to the resistor 20, whose resistance is greater than that of the characteristic impedance $Z_0$, so that the magnitude of the reflection, or fiducial pulse, is set to be equal to reflection from the air/liquid interface.

The sample and hold circuit 50 is also connected to the node 54, and is gated at a 2 MHz rate by a sequence of gate pulses applied over the gating path 44. The sample and hold circuit 50 includes a switch or sampler 52, and a hold capacitor 59 connected to ground for holding the sampled reflected pulses. The sampler 52 is driven by the gate pulses into a sequence of alternating openings and closures. The gating pulses are delayed over a range of delays of approximately 5–10 ns from the time the launcher plate 18 emits the transmit impulses. The timing of the gate pulses is controlled by a swept range delay generator 53 with a 40 Hz sweep rate, such that each gate pulse is linearly swept through its full range of delays every 1/40 second. This causes a sampled voltage to appear across the hold capacitor 59 that is an equivalent time (ET) replica of the real time reflected pulses seen at the input of the sample and hold circuit 50. In other terms, waveforms occurring on a nanosecond time scale are converted to identically shaped waveforms appearing on a millisecond time scale.

The range delay generator 53 drives a pulse generator 55 which generates a 5 V, 200 ps rise time step-like pulse. The output of the pulse generator 55 is edge-differentiated by a capacitor 57 into a 200 ps-wide impulse that is applied to the sample and hold circuit 50.

The size of the capacitor 59 is sufficiently large that each sample only partially charges it, and approximately 10–100 samples are required to reach an equilibrium with the signals that appear across the termination resistor 51 ($R_T$). In one exemplary design, the capacitor 59 is on the order of 22 picofarads. The product of the impedance $Z_0$ in parallel with the resistance $R_T$ and the capacitance of capacitor 59 yields a time constant which is much greater than the width of the gating pulse, such that it takes many pulses to charge capacitor 59. For instance, if a 200 ps wide pulse is propagated from the launcher plate 18, the reflected pulse coincides with the gating pulse. Each received pulse produces an incremental voltage change $\Delta V$ on the capacitor 59 of the sample and hold circuit 50, and the net capacitor voltage is the output of the averaging sampling and hold circuit 50. The increment $\Delta V = 1/N$ of the total received pulse, where N is the number of samples averaged, typically about 10–100. It should be understood that N can assume an arbitrary value.

The noise voltage at the sample and hold circuit 50 is reduced by a factor related to the square root of the number of samples averaged, ten times in this case, and by a factor related to the effective time constant of the averaging circuit relative to the PRF of the system and the instantaneous bandwidth of the sampler—a factor stemming from the sampled data nature of the sample and hold circuit 50. In all, greater than 20 dB noise reduction is obtained compared to a circuit with 2 GHz bandwidth, i.e., the bandwidth of the propagated pulse.

The equivalent time replica at the output of the sample and hold circuit 50 is applied to an amplifier 61 with a gain of at least 100 and a passband of 10 Hz–10 KHz to provide equivalent time amplitudes on the order of 1 volt peak. The output of the amplifier 61 provides an analog signal indicating the timing relation between the fiducial and air/liquid reflection pulses.

Positive and negative threshold comparators 63 and 64, respectively, are connected to the output of the amplifier 61 in order to detect the equivalent time fiducial pulse from the launcher plate 18 and the reflected pulses from the surface level 23 or interface layer, as well as to toggle a set-reset flip-flop 66 in order to generate a range counter gate pulse.

The output of the set-reset flip-flop 66 and the output of the PRF/PRI generator 40 are input to an AND gate 68, whose output is fed to a range counter 70. The range counter 70 is clocked at a 2 MHz rate in order to provide a very high range resolution. For an equivalent time scale factor of 1.0 ms=1.0 inch on the guide wire 14, each range counter pulse at a 2 MHz rate corresponds to 0.5 mils, i.e., 0.0005 inch (1 in×0.5 µs/1.0 ms).

In one experiment, the observed jitter was on the order of 0.001 inch rms at a measurement update interval of ¼₀ second. The range counter 70 can accumulate readings for the purpose of averaging, in order to obtain lower jitter. The output of the range counter 70 drives a display 72 and may also be transferred to a processor (not shown) prior to reset.

The accuracy of the sensor 10 varies by less than 0.1 inch over a wide temperature range. Such a desirable stability results from (1) the use of the fiducial pulse to eliminate timing offset drift in the direct transmit path 42, in the gating path 44 and in the cable 16; (2) the minimization of pulse amplitude variations by the use of nearly equal magnitude fiducial and reflection pulse detection thresholds, $+V_{TH}$ and $-V_{TH}$; and (3) the use of stable RC components in the range delay generator 53 and range ramp circuitry 77.

The timing delay of range delay generator 53 is controlled in response to a ramp signal supplied by a ramp generator 77. The ramp signal causes the range delay generator 53 to sweep over a range of delays corresponding to the expected reflections to and from the liquid level 23.

The ramp generator 77 is driven by a 40 Hz scan oscillator 78. It should be understood that the 40 Hz oscillation frequency can be alternatively derived from the 2 MHz PRF/PRI generator 40 by means of conventional digital frequency dividers. The output of the 2 MHz PRF/PRI generator 40 is connected to the AND gate 68. When the comparator 64 detects the equivalent time fiducial pulse from the amplifier 61, the flip flop 66 is set, enabling the AND gate 68 to supply a 2 MHz clock to the range counter 70. The range counter 70 counts up at the 2 MHz rate until the comparator 63 detects that the equivalent time fluid level reflection pulse from the amplifier 61 exceeds the threshold. At that point, the flip flop 66 is reset, disabling the AND gate 68 and stopping the range counter 70. The data in the range counter 70 can then be supplied across bus 79 to a signal processor (not shown) and/or to the fluid level display 72.

Also, on the leading edge of each 40 Hz ramp, a reset signal is supplied to the range counter which resets the range count to zero for a subsequent sweep. This leading edge also signals the start of the range sweep and may be used to synchronize a monitor oscilloscope or data transfer circuitry.

Measurement drift due to drift in the range ramp timing which affects the equivalent time (ET) scale factor can be eliminated with a range ramp generator 77 that is based on a PRF-clocked range counter connected to a digital to analog converter (DAC) to provide a digitally incremented ramp voltage. In this case, variations in the PRF will affect the range ramp time scale, but this variation will cancel since the range counter 70 and the range ramp generator 77 are ratiometric. For example, if the PRF decreases, the range ramp will take longer to cycle through its full range, causing an increase in the range counter gate pulse width, but the number of pulses gated will remain exactly the same since this wider pulse gates a slower PRF.

With this dual counter arrangement, the only uncompensated source of drift will be the RC network forming the real time range delay circuit. Low cost RC components are available with less than 30 parts per million/°C. drift, which is adequate for most measurements. The drift in the RC network affects the sensor scale factor only, i.e., the apparent length of the guide wire 14. Zero offset, or the position of the launcher plate 18 relative to the surface level 23 or interface layer, is fixed by the use of the fiducial pulse.

Figure 5A:
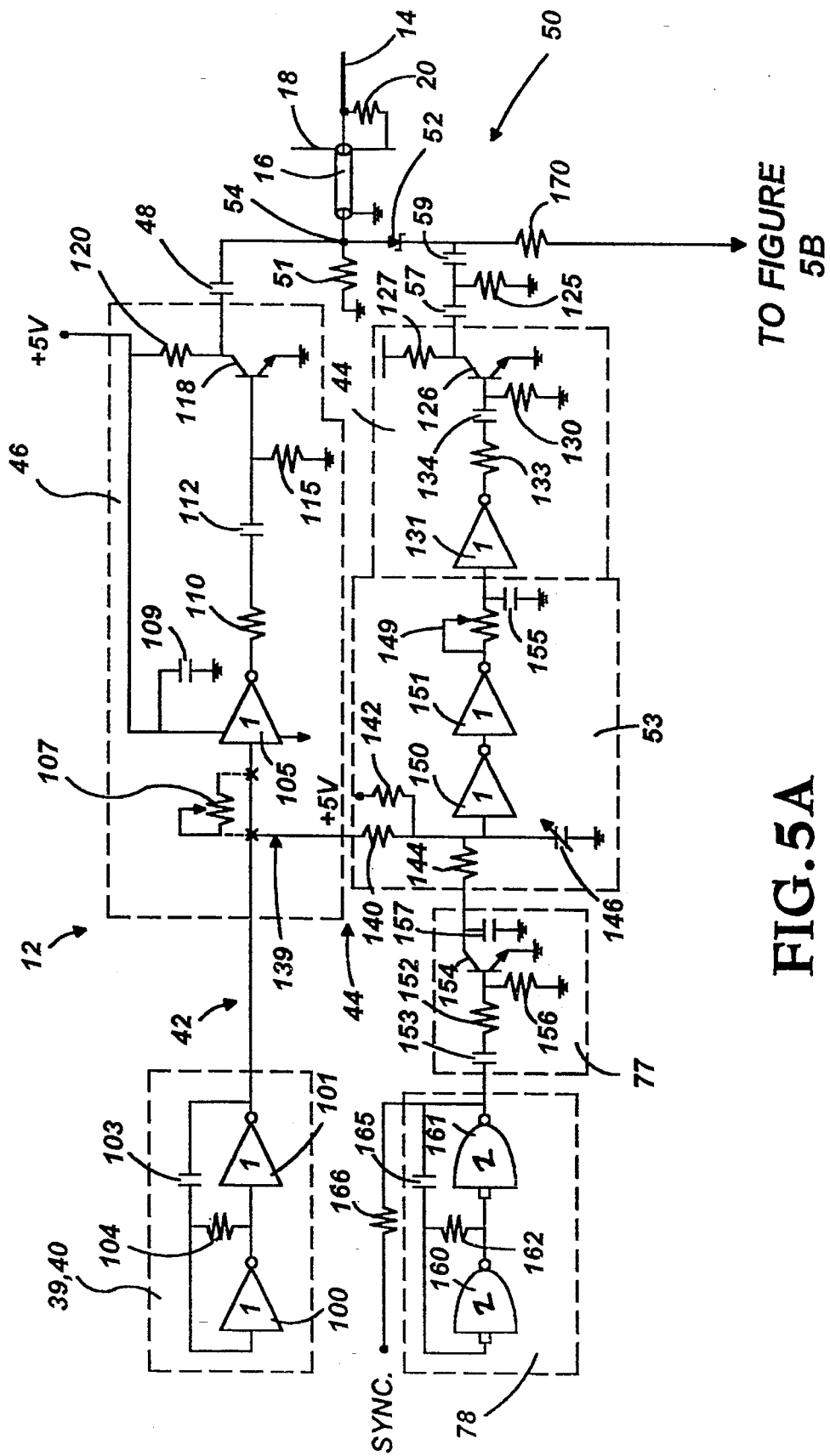
FIGS. 5A and 5B illustrate a detailed circuit diagram of the sensor of FIGS. 1 through 4.
Figure 5B:
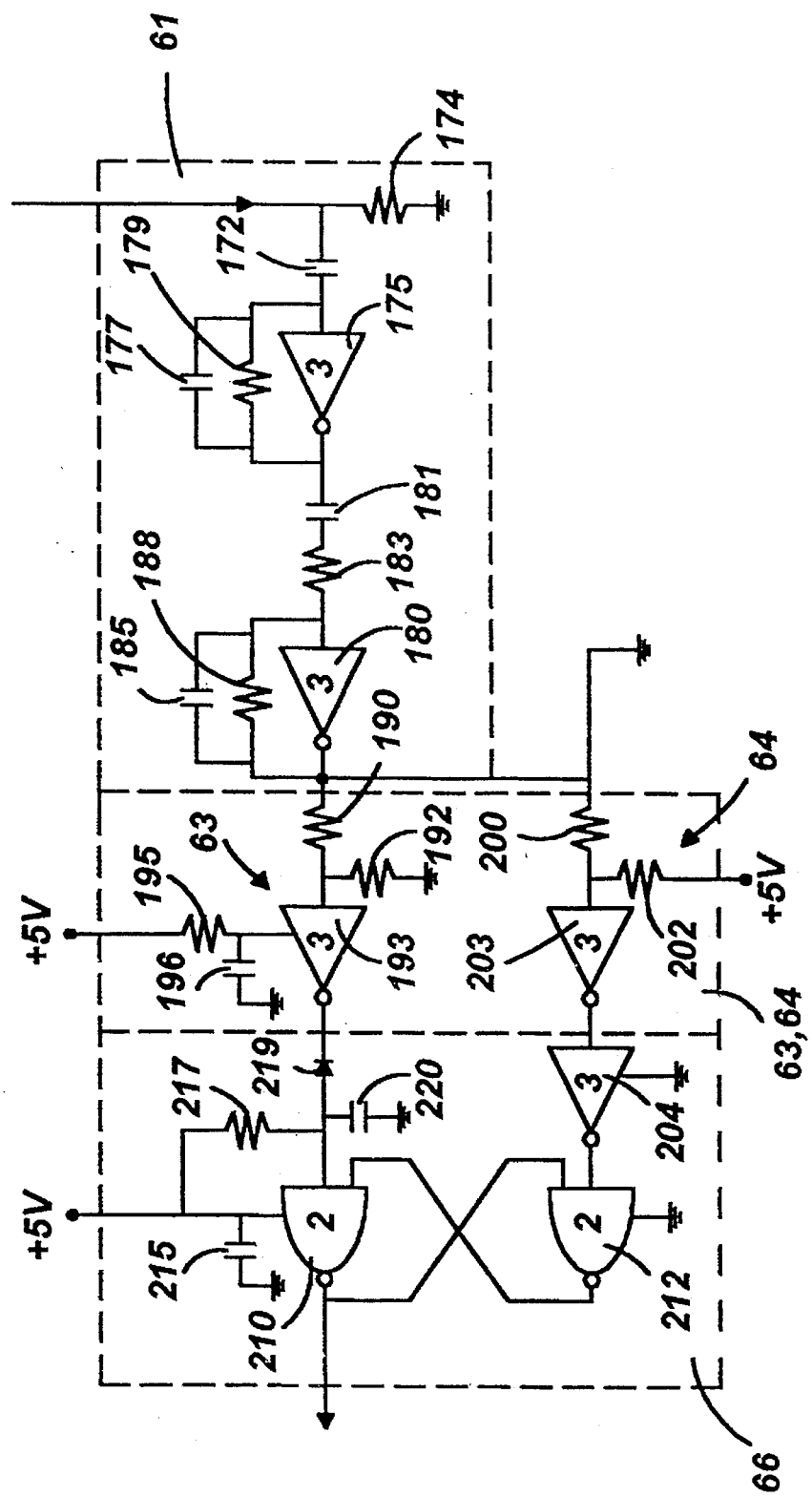

FIGS. 5A and 5B illustrate an exemplary circuit diagram of the preferred embodiment of the sensor 10. The noise generator 39 is described in copending U.S. patent application Ser. No. 08/044,717, filed on Apr. 12, 1993, now U.S. Pat. No. 5,361,070, issued Nov. 1, 1994, by Thomas E. McEwan, entitled "Ultra-Wideband Radar Motion Sensor", which is incorporated herein by reference in its entirety. The PRF/PRI generator 40 includes two inverters 100 and 101 (I1=74ACO4) connected in series. A feedback path extends between the input of the inverter 100 and the output of the inverter 101, and includes a series capacitor 103 (C=22 picofarads). A resistor 104 (R=10 kilohms) is connected between the input and output terminals of the inverter 100.

The fast pulse generator 46 includes an inverter 105 (I1=74ACO4), whose input is connected to the output of the inverter 101. A delay trim potentiometer 107 can be optionally connected in series with the input of inverter 105. The power supply pin of the inverter 105 is connected to a +5 V power supply bus, and to a bypass capacitor 109 (C=0.01 farad). The output of the inverter 105 is connected in series to a resistor 110 (R=22 ohms) and a capacitor 112 (C=10 picofarads). A resistor 115 (R=1 kilohm) to ground is simultaneously connected to the capacitor 112 and to the base of a transistor 118 (BFR92). The collector of the transistor 118 is connected to the +5 V power supply bus via a resistor 120 (R=1 kilohm). The emitter of transistor 118 is connected to ground.

The capacitor 48 is connected between the collector of the transistor 118 and the node 54 connecting the proximal end of a 50-ohm coaxial cable 16, the termination resistor 51 and the sample and hold circuit 50. In the present example, the coaxial cable 16 is, in turn, connected to a square shaped launcher plate 18 having a side dimension of about 2 inches (other dimensions are also possible).

The sampler 50 includes a Schottky diode 52 (HP HSMS2810) and the hold capacitor 59, which is connected at one end to the diode 52 and at its other end to ground via a resistor 125 (R=100 ohms). The capacitor 57 (C=0.5 picofarad) is connected between the capacitor 59 and the pulse generator 44.

The pulse generator 44 includes a transistor 126 (BFR92), whose collector is connected to the capacitor 57, and to the +5 V power source bus via a resistor 127 (R=1 kilohm). The emitter of the transistor 126 is connected to ground, while its base is connected to a bias resistor 130 (R=1 kilohm) which is connected to ground. The pulse generator 44 further includes an inverter 131 (I1=74ACO4) whose input is connected to the range delay generator 53, and whose output is connected in series to the base of the transistor 126 via a resistor 133 (R=22 ohms) and a capacitor 134 (C=10 picofarads).

The range delay generator 53 has its first input terminal 139 connected to one end of a resistor 140 (R=4.7 kilohms). The other end of the resistor 140 is connected to the +5 V power supply bus via a resistor 142 (R=10 kilohms), to the ramp generator 77 via a resistor 144 (R=4.7 kilohms), to a variable shunt capacitor 146 (C ranges between 2 to 6 picofarads) which is connected to ground, and to the input of a first inverter 150 (I1=74ACO4). This simple RC delay circuit (144, 146) provides an exponential delay function with respect to control range delay voltage supplied thereto. The output of this first inverter 150 is connected to the input of a second inverter 151 (I1=74ACO4), which, in turn, is connected to the input of the inverter 131 via a potentiometer 149. The output of the resistor 149 is connected to a shunt capacitor 155 (C=4.7 picofarads) to ground.

The ramp generator 77 includes a capacitor 153 (C=0.1 microfarad) that is connected at one end to the output of the 40 Hz scan oscillator 78, and at its other end to the base of a transistor 154 (2N2222) via a resistor 152 (R=1 kilohm). The base of the transistor 154 is connected to a bias resistor 156 (R=10 kilohms) to ground. The emitter of the transistor 154 is connected to ground. A ramp timing capacitor 157 (C=1 microfarad) is connected between the collector of the transistor 154 and ground. The collector of transistor 154 is connected to resistor 144 of range delay generator 53.

The 40 Hz scan oscillator 78 includes two NAND gates 160, 161 (I2=74HC00) connected in series, such that the output of the NAND gate 161 is connected to the capacitor 153 of the ramp generator 77. The input of the NAND gate 160 is connected to the output of the NAND gate 161 via a capacitor 165 (C=0.01 farad). The input of the NAND gate 161 is also connected to its output via a resistor 162 (R=2.2 megohms). The output of the NAND gate 161 is connected to a "SYNC" terminal via a resistor 166 (R=10 kilohms). The "SYNC" terminal provides a synchronizing pulse to an oscilloscope (not shown) for test purposes.

Turning now to FIG. 5B, the input of the amplifier 61 is connected to the cathode of the Schottky diode 52 and to the hold capacitor 59 via a resistor 170 (R=10 kilohms). The amplifier 61 includes a capacitor 172 (C=0.1 microfarad) that is connected at one end to a bias the input and to resistor 174 (R=1 megohm) to ground, and at its other end to the input of an inverter 175 (I3=MC14069). The inverter 175 is connected to a feedback RC circuit formed of a capacitor 177 (C=100 picofarads) and a resistor 179 (R=2.2 megohms) in parallel. The output of the inverter 175 is connected to the input of an inverter 180 (I3=MC14069) via a capacitor 181 (C=2 microfarads) and a resistor 183 (R=100 kilohms). The inverter 180 is connected to a feedback RC circuit formed of a capacitor 185 (C=470 picofarads) and a resistor 188 (R=470 kilohms) in parallel.

The positive threshold comparator 63 includes an input resistor 190 (R=330 kilohms) which is connected at one end to the output of the inverter 180, and at its other end to a bias resistor 192 (R=1 megohm) to ground and to the input of an inverter 193 (I3=MC14069). The power supply pin of I3 is connected to the +5 V power supply bus via a resistor 195 (R=1 kilohm), and is further connected to a bypass capacitor 196 (C=100 microfarads) to ground.

The negative threshold comparator 64 includes an input resistor 200 (R=330 kilohms) which is connected at one end to the output of the inverter 180. The other end of the resistor 200 is connected to the +5 V power supply bus via a bias resistor 202 (R=680 kilohms) and to the input of an inverter 203 (I3=MC14069).

The set-reset flip-flop 66 includes two NAND gates 210, 212 (I2=74HC00), wherein the power supply pin of I2 is connected to the +5 V power supply bus and to a bypass capacitor 215 (C=0.01 microfarad) to ground. One input of the NAND gate 210 is connected to the output of the inverter 193 via a diode 219, and also to the +5 V power supply bus via a resistor 217 (R=1.5 megohm). The anode of the diode 219 is connected to a timing capacitor 220 (C=0.003 microfarad) to ground. The output of the inverter 203 is connected to the input of the NAND gate 212 via an inverter 204 (I3=MC14069).

Figure 6:
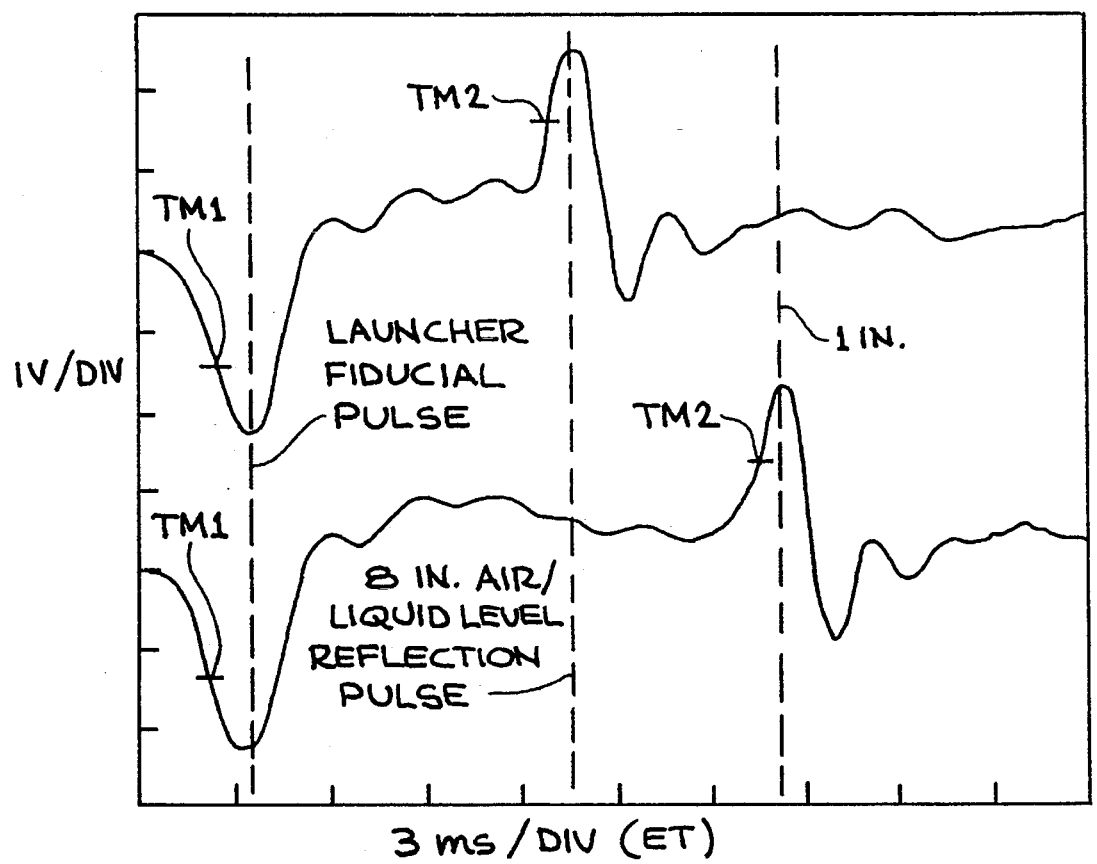
FIG. 6 represents the oscilloscope traces of an equivalent time fiducial pulse occurring at a launcher plate forming pad of the sensor of FIGS. 1 through 5, and air/fluid reflection pulses for 1 inch and 8 inches immersion levels.

FIG. 6 represents oscilloscope traces of the ET fiducial pulse occurring at the launcher plate 18 and the air/fluid reflection pulses P(1) and P(8), respectively for 1 inch and 8 inches immersion levels of the guide wire 14. The air/fluid reflection pulse is about 200 picoseconds wide. The gate pulse for the range counter 70 starts at a tick mark TM1 on the fiducial and ends at a tick mark TM2 on the air/fluid reflection pulse, thus measuring the length of the guide wire 14 above the fluid level 23.

It should be clear to those skilled in the art after reviewing the present description of the invention that various modifications can be made without departing from the scope of the present invention. For instance, while the foregoing circuit diagram has been described in terms of discrete components, the circuit can be integrated and miniaturized according to well known integrated circuit techniques. The launcher plate 18 can assume various planar and non-planar shapes and geometrical dimensions, for example contoured for use on irregularly shaped containers.

The transmission line or wave guide 14 can assume various designs. For instance, it can be formed of a single wire; two wires; two wires separated by a dielectric; a hollow tube; a conducting tube with a dielectric core or slotted walls for the electromagnetic wave to sample the fluid outside the tube; a dielectric tube; or other variations. It would also be possible to use the existing metal structural members of the container to serve as the guide wire 14.

Figure 7:
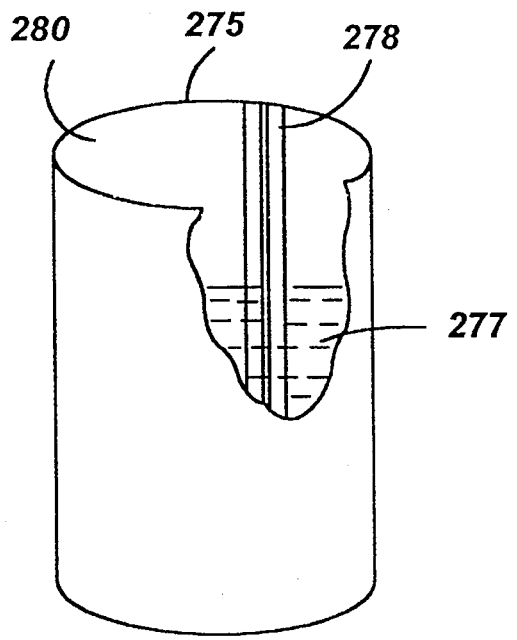
FIG. 7 is a schematic cutaway view of a container having a microstrip transmission line sensor along its wall.

FIG. 7 is a schematic, perspective cutaway view of a dielectric or metal container 275 which stores a fluid 277. In this illustration, the guide wire is a microstrip 278 which is attached to the inner surface 280 of the container 275, and which extends axially to a predetermined depth. In this particular embodiment, the launcher plate is not strictly needed, however, the resistor 20 may be required at the top end of the microstrip to introduce an impedance discontinuity and thus a fiducial pulse. The microstrip 278 may be covered with a protective dielectric coating with negligible effect on the reflected pulse magnitude.

FIG. 3 also illustrates the linear displacement mode of the sensor 10, where the electromagnetic guide wire 14 generally projects in free space, and a metal or dielectric object 28 touches, or is placed or is moved in close proximity to the guide wire 14, creating measurable reflection, as described above in relation to the operation of the sensor 10. The guide wire 14 may be formed of a microstrip or other types of transmission lines.

Figure 8:
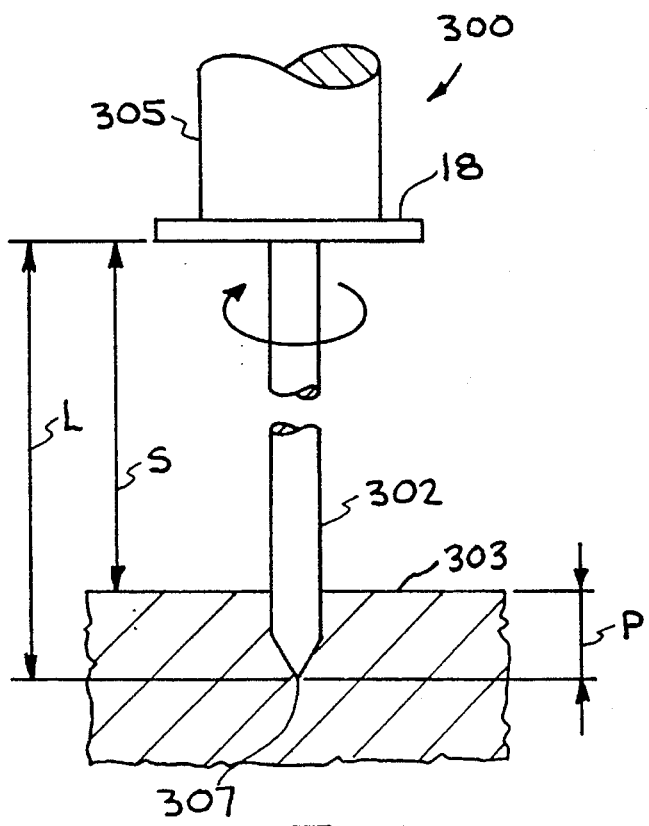
FIG. 8 is side view of a drill using the sensor of the present invention to determine the drilling depth.

FIG. 8 is side view of a construction tool, such as a drill 300 using the sensor 10 of the present invention to accurately determine the penetration depth (P) of a drill bit 302, beyond a surface level 303. The launcher plate 18 is secured to the drill body 305, such that the distance (L) between the drill bit tip 307 and the launcher plate 18 is fixed. For instance, in some applications, the distance (L) is the same as the total length of the drill bit 302. As the drilling operation starts, the sensor 10 determines the distance (S) between launcher plate 18 and the surface level 303, thus providing an accurate reading of the penetration depth (P), according to the following equation:

$$P = L - S.$$

While specific embodiments of the inventive material level sensor have been illustrated and described, modifications and changes of the apparatus, parameters, materials, methods of manufacture, use and operation will become apparent to those skilled in the art, without departing from the scope of the invention.

I claim:

1. A sensor for determining the surface or interface level of a material comprising in combination:

a transceiver for generating electrical transmit pulses;

a guide wire at least partially immersed in the material;

a conductor electrically coupling said transceiver and said guide wire;

a launcher plate connected to said conductor at said coupling to said guide wire;

said transmit pulses being conducted over said conductor to said launcher plate, said launcher plate acting as a transmit antenna ground plane, and helping launch said electrical pulses as near field, guided electromagnetic (EM) waves, and also producing a fiducial pulse back to the transceiver;

said EM waves propagating along said guide wire, and being at least partially reflected by the surface or interface;

said reflected EM waves propagating back along said guide wire toward said launcher plate, said launcher plate acting as a receive antenna ground plane, and therefrom said reflected EM waves being transmitted as reflected pulses to said transceiver; and said transceiver determining a time delay between said fiducial and reflected pulses, thus establishing the surface or interface level relative to said launcher plate.

2. The sensor according to claim 1, wherein said conductor is a coaxial cable having an inner conductor and an outer shield, said launcher plate is connected to said outer shield for preventing the inducement of a mirror image voltage thereon, and said inner conductor is connected to the guide wire.

3. The sensor according to claim 2, further including an impedance connected between said launcher plate and said guide wire to provide a local impedance discontinuity which causes partial reflection of said EM waves to produce said fiducial pulse, such that measurements taken between said fiducial pulse and said reflected pulses reduce errors and drift introduced by said coaxial cable.

4. The sensor according to claim 1, wherein said transceiver measures the round trip travel time of said fiducial and reflected pulses and produces an equivalent time (ET) gate to a counter; and wherein the duration of said ET gate increases with the increasing distance between said launcher plate and the material surface or interface.

5. The sensor according to claim 1, wherein said transceiver includes a pulse repetition frequency/pulse repetition interval (PRF/PRI) generator and a noise generator for modulating said PRF/PRI generator, in order to generate a PRF with a 10 kHz–10 MHz average and 1–10% random variation (dither) about said average; and wherein the dither spreads the emission spectrum from said launcher plate to reduce potential interference with RF spectrum users, and also to randomize samples of extraneous interfering signals appearing at said guide wire.

6. The sensor according to claim 1, wherein said transceiver comprises means to sample and average said reflected pulses, such that the randomized samples average to zero, thus substantially eliminating interference from other sources.

7. The sensor according to claim 1, wherein said transceiver includes a pulse repetition frequency/pulse repetition interval (PRF/PRI) generator simultaneously connected to a transmit path and to a gating path.

8. The sensor according to claim 7, wherein said transceiver further comprises a pulse generator connected to said PRF/PRI generator which provides a less than 10 ns rise time step-like pulse;

a differentiator for edge-differentiating said step-like pulse into a less than 10 ns-wide impulse; and wherein said impulse is applied to said coaxial cable and therefrom to said launcher plate.

9. The sensor according to claim 1, wherein said guide wire is a microstrip transmission line.

10. A method for sensing the surface or interface level of a material comprising the steps of:

electrically coupling a conductor to a guide wire;

connecting a launcher plate between said conductor and guide wire;

immersing said guide wire at least partially in the material;

inputting electrical transmit pulses into said conductor, said transmit pulses being conducted over said conductor to said launcher plate, said launcher plate acting as a transmit antenna ground plane, and helping launch said electrical pulses into said guide wire as near field, guided electromagnetic (EM) waves, and also producing a fiducial pulse back into the conductor;

waiting for a period of time ($T_{SAMP}$);

said EM waves propagating along said guide wire, and being at least partially reflected by the surface or interface;

said reflected EM waves propagating back along said guide wire toward said launcher plate, said launcher plate acting as a receive antenna ground plane, and therefrom said reflected EM waves being transmitted as reflected pulses to said conductor;

opening a gate to allow said reflected pulses to be sampled;

repeating said waiting and opening steps at about 10 kHz to 10 MHz rate, for allowing approximately 10 to 10,000 reflected pulses to be averaged prior to incrementing $T_{SAMP}$; and determining a time delay between said fiducial and reflected pulses, thus establishing the surface or interface level relative to said launcher plate.

11. The method of claim 10 wherein said transmit pulses have a rise time of less than about 10 ns.

12. A sensor for determining the surface or interface level of a material comprising:

a pulse generator for generating electrical transmit pulses;

a guide wire at least partially immersed in the material;

a conductor electrically coupling said pulse generator and said guide wire, for conducting said transmit pulses to said guide wire as near field, guided electromagnetic (EM) waves, such that said EM waves are at least partially reflected by the surface or interface and converted to corresponding electrical reflected pulses;

a sampler connected to the conductor for sampling said reflected pulses and consisting of a single diode; and circuitry connected to the pulse generator and sampler for determining a time delay between said transmitted and reflected pulses for establishing the surface or interface level.

13. A sensor for determining the surface or interface level of a material comprising:

a pulse generator for generating electrical transmit pulses;

a guide wire at least partially immersed in the material;

a conductor electrically coupling said pulse generator and said guide wire, for conducting said transmit pulses to said guide wire as near field, guided electromagnetic (EM) waves, such that said EM waves are at least partially reflected by the surface or interface and converted to corresponding electrical reflected pulses;

a sample and hold circuit connected to the conductor for receiving said reflected pulses;

an exponential range delay circuit connected between the pulse generator and sample and hold circuit for controlling the timing of gate pulses transmitted to the sample and hold circuit; and circuitry connected to the pulse generator and sample and hold circuit for determining a time delay between said transmitted and reflected pulses for establishing the surface or interface level.

14. The sensor according to claim 13, wherein said exponential range delay circuit includes an RC delay circuit that provides an exponential delay function.

15. The sensor according to claim 14, wherein said exponential range delay circuit further includes an equivalent time exponential ramp used as a sweeping input to said RC delay circuit in order to provide a linear swept delay function.

16. The sensor according to claim 13, wherein said sample and hold circuit includes a hold capacitor and a sampler consisting of a single diode.

17. The sensor according to claim 16, wherein each gate pulse is linearly swept through a range of delays for causing a sampled voltage to appear across said hold capacitor, and for causing a sampled voltage to appear across said hold capacitor that is an equivalent time replica of said reflected pulses.

18. In a sensor for determining the surface or interface level of a material, apparatus comprising:

a pulse repetition interval generator;

a transmit pulse generator connected to the pulse repetition interval generator;

a differentiation capacitor connected to the transmit pulse generator;

a termination resistor connected from the differentiation capacitor to ground;

a conductor having a first end connected to the differentiation capacitor and termination resistor;

a transmission line connected to a second end of the conductor and being immersible into the material;

a high input impedance sampler having a first input connected to the first end of the conductor;

a hold capacitor connected to the output of the sampler;

a ramp delay generator having a first input connected to the pulse repetition interval generator;

a delay pulse generator connected to the ramp delay generator;

a delay pulse differentiation capacitor connected to the delay pulse generator and connected to a second input of the sampler.

19. The apparatus of claim 18 further comprising an equivalent time ramp generator connected to a second input of the ramp delay generator.

20. The apparatus of claim 19 wherein the ramp generator has an exponential voltage output.

21. The apparatus of claim 20 wherein the ramp delay generator produces an exponential delay as a function of input.

22. The apparatus of claim 21 wherein the ramp generator has an exponential time constant which is less than the time constant of the ramp delay generator.

23. The apparatus of claim 22 wherein the ramp generator has a millisecond time constant and the ramp delay generator has a nanosecond time constant.

24. The apparatus of claim 18 further comprising:

an amplifier connected to the hold capacitor;

first and second comparators connected to the amplifier, the first comparator having a reference input $-V_{TH}$, the second comparator having a reference input $+V_{TH}$;

a set/reset flip flop having its set input connected to the first comparator and its second input connected to the second comparator.

25. The apparatus of claim 24 further comprising:

a gate having a first input connected to the set/reset flip flop and a second input connected to the pulse repetition interval generator wherein the flip flop enables and disables the gate;

a range counter connected to the gate.

26. The apparatus of claim 25 further comprising a scan oscillator connected to the ramp generator and to the range counter.

27. The apparatus of claim 26 wherein the scan oscillator operates at a submultiple of the pulse repetition interval generator.

28. The apparatus of claim 18 further comprising a noise generator connected to the pulse repetition interval generator for dithering the pulse repetition interval generator.

29. The apparatus of claim 18 wherein either of the transmit pulse generator and the delay pulse generator comprises a logic gate and a bipolar transistor driven by said logic gate.

30. The apparatus of claim 21 wherein the ramp delay generator comprises a series resistor and adjustable capacitor in shunt to ground and the ramp generator comprises a resistor and capacitor in series.

31. The apparatus of claim 18 further comprising a launcher plate connected to the second end of the conductor.

32. The apparatus of claim 18 wherein the sampler is a diode.

33. The apparatus of claim 24 wherein the amplifier is a transimpedance amplifier.

* * * * *